July 17, 1956 R. M. KEE 2,754,917
ROTOR BLADE WITH BALANCING WEIGHT
Filed Oct. 1, 1952 2 Sheets-Sheet 1

INVENTOR
ROBERT M. KEE
BY M. B. Tasker
ATTORNEY

July 17, 1956  R. M. KEE  2,754,917
ROTOR BLADE WITH BALANCING WEIGHT
Filed Oct. 1, 1952  2 Sheets-Sheet 2

INVENTOR
ROBERT M. KEE
BY M. B. Tasker
ATTORNEY

United States Patent Office 2,754,917
Patented July 17, 1956

2,754,917

ROTOR BLADE WITH BALANCING WEIGHT

Robert M. Kee, Stratford, Conn., assignor to United Aircraft Corporation, East Hartford, Conn., a corporation of Delaware Application October 1, 1952, Serial No. 312,590

13 Claims. (Cl. 170—159)

This invention relates to improvements in rotary wing aircraft and particularly to improvements in metal blades for such aircraft of the type in which a metal spar forms the leading edge and main strength member of the blade and conforms to the airfoil contour of the blade throughout a substantial chordwise portion thereof. In rotor blades of this general type the chordwise airfoil contour of the blade is completed by a spanwise arranged series of sheet metal pockets, or boxes, secured to the aft edge of the spar member.

Centrifugal forces caused by the rotation of the blades set up bending moments in the blade due to the non-structural trailing edge pockets which lie aft of the center of gravity of the blade. As a result the bending axis of the spar will tend to lie some distance ahead of the center of gravity of the blade particularly where the counterbalance for the non-structural pockets of the blade is incorporated in the leading edge of the spar as part of its structural mass.

In a copending application of Michael E. Gluhareff, Serial No. 186,021, filed September 21, 1950 and assigned to the assignee of this application, a construction is disclosed in which spanwise arranged weight members are provided adjacent the leading edge of the spar member for correcting the tendency of this type of blade to bend forwardly in the plane of rotation due to the location of the center of gravity of the whole blade at the 25% chordline of the blade which lies behind the bending axis of the leading edge spar member.

Other rotor blade applications assigned to applicant's assignee are application Serial No. 546,072 filed November 10, 1955 as a continuation-in-part of application Serial No. 271,522 filed February 14, 1952, now abandoned; and application Serial No. 154,620 filed April 7, 1950.

It is an object of this invention to provide improved weight members for a blade of this type.

A further object of the invention is to provide such improved weight means for cooperating with the spar member in a new manner to support the weight members.

These and other objects and advantages of the invention will be obvious from the following description of a preferred embodiment of the invention shown in the accompanying drawings.

Figure 1:
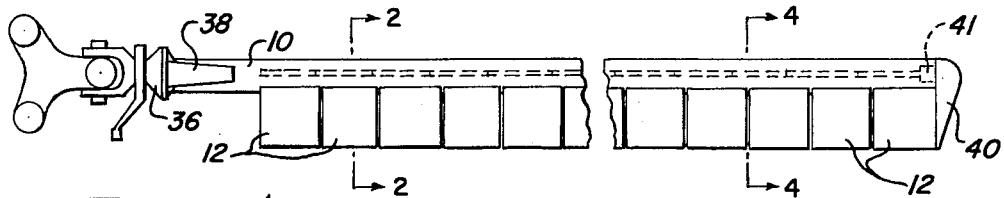
Fig. 1 is a plan view of a rotor blade embodying the invention.
Figure 2:
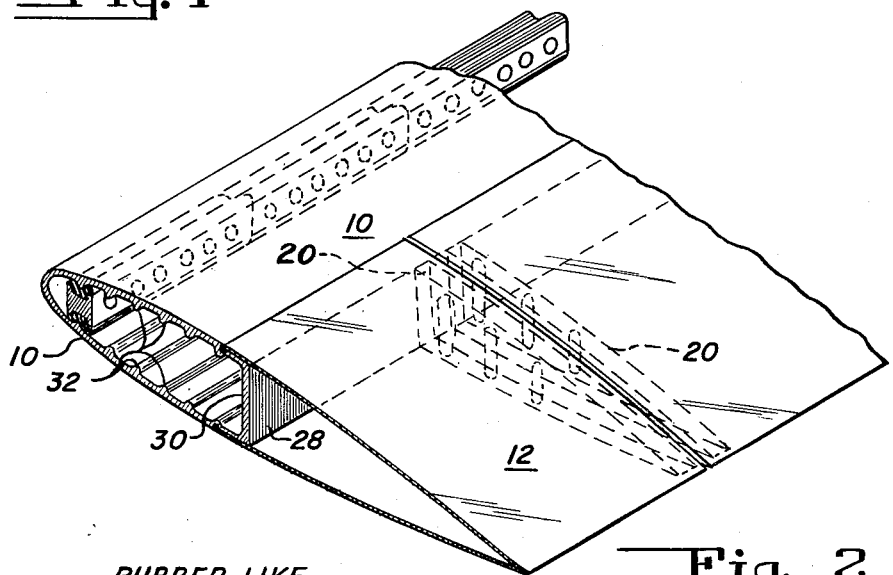
Fig. 2 is a perspective sectional view on an enlarged scale taken on line 2—2 of Fig. 1.
Figure 4:
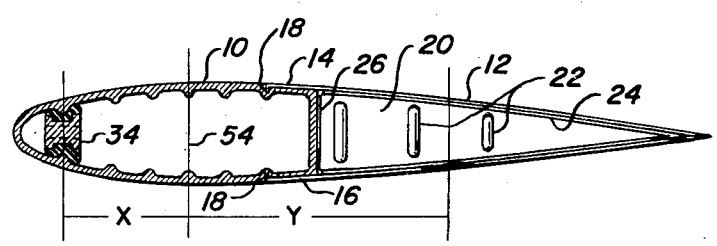
Fig. 4 is a sectional view taken on line 4—4 of Fig. 1.

As herein shown the rotor blade consists essentially of an extruded metal spar member 10 which extends from the root to the tip of the blade and comprises the main strength member as well as the leading edge portion of the blade. Referring to Figs. 2 and 4, it will be noted that the spar forms a substantial chordwise portion of the blade and conforms to the airfoil contour thereof. The remainder of the chordwise extent of the blade is made up of V-shaped metal pockets, or boxes, 12 the upper and lower forward edges 14 and 16 of which are adhesively secured to rabbets 18 formed along the upper and lower aft edges of the spar. As shown in Figs. 2 and 4, each of the pockets 12 is virtually a separate metal box having ribs 20 which form end closures therefor. The ribs are provided with stiffening dimples 22 and are also provided with upper and lower out-turned flanges 24 which are adhesively secured to the upper and lower surface sheets of the pockets and a forward flange 26 which is adhesively secured to the vertical aft face 28 of a web 30 forming the aft wall of the tubular spar. The ribs 20, being located inwardly from the edge of the pockets by the width of flanges 24, form confronting recesses for the purpose of receiving a block of resilient material, not shown, between adjacent pockets which seal the gaps between pockets.

Figure 3:
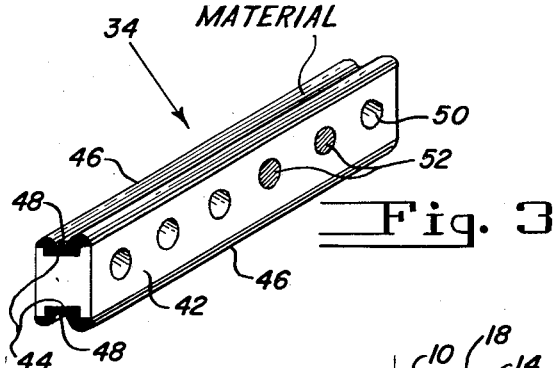
Fig. 3 is an enlarged perspective view of one of the improved weight members.

The extruded spar is in the form of a single tube free from internal spanwise extended webs which are replaced by longitudinal internal ribs, or beads, 32 which are provided to strengthen the spar. One pair of these ribs 32 is provided adjacent the leading edge of the blade in the correct position to support the weight members 34 one of which is shown in detail in Fig. 3.

The spar 10, except at its root attaching portion, is of uniform cross-section throughout its length. The blade is supported on the rotor hub by a root attaching fitting 36 which has upper and lower furcations 38 which receive the spar member therebetween and are adhesively secured thereto. The outboard end of the blade is completed by an end cap 40 which forms a closure for the hollow spar as well as for the end of the last trailing edge pocket. A filler plate 41 is also provided which forms an inner closure for the spar and a bearing surface for the weight members. It will be evident that by removing the cap member 40 and filler plate 41, access can be had to the interior of the spar for initially placing or subsequently adjusting these weights to balance the blade.

Preferably the weight members 34 are relatively short, as herein shown about the length of one of the trailing edge pockets. Each weight member includes a bar 42 of substantial mass, preferably of metal, having longitudinal channel-shaped upper and lower edges 44. The channels 44 of the upper and lower edges of the bar have identical strips of rubber-like material 46 located therein and permanently secured thereto by a suitable adhesive bond. Each strip 46 has a surface groove 48 therein which is shaped to conform to a rib 32 of the spar enabling these weight members to be inserted from the outboard end of the spar with the upper and lower foremost bead 32 of the spar received in the grooves 48 on the upper and lower edges of the weight members. The rubber-like strips are not exactly symmetrical on opposite sides of the grooves 48. As will be evident from Fig. 3, the strip is somewhat thicker on the aft side of the groove 48 than it is on the fore side so that the edges of the weight members conform to the spar not only at the upper and lower beads 32 but they also conform to the slight increase in spacing between the upper and lower inner surfaces of the spar due to the airfoil shape thereof. The rubber-like strips 46 may be formed of any suitable material which has sufficient resilience to enable the weight members to be readily inserted into position in the spar and to hold them snugly in place chordwise between the upper and lower inner surfaces thereof during rotation of the blade.

As many of the weight members 34 as are required may be inserted in the blade, extending from the outboard portion of the blade inboard the required distance. The weight members will remain outboard due to centrifugal force, and will bear on the filler plate 41. The desired balance of the blade can be obtained by using weight members of different material and weight and further variation may be obtained by providing spanwise spaced fore and aft lighter holes 50 which enable fine adjustment of the weight distribution to be made in the field by filling one or more of these holes with lead 52 as required.

Figure 5:
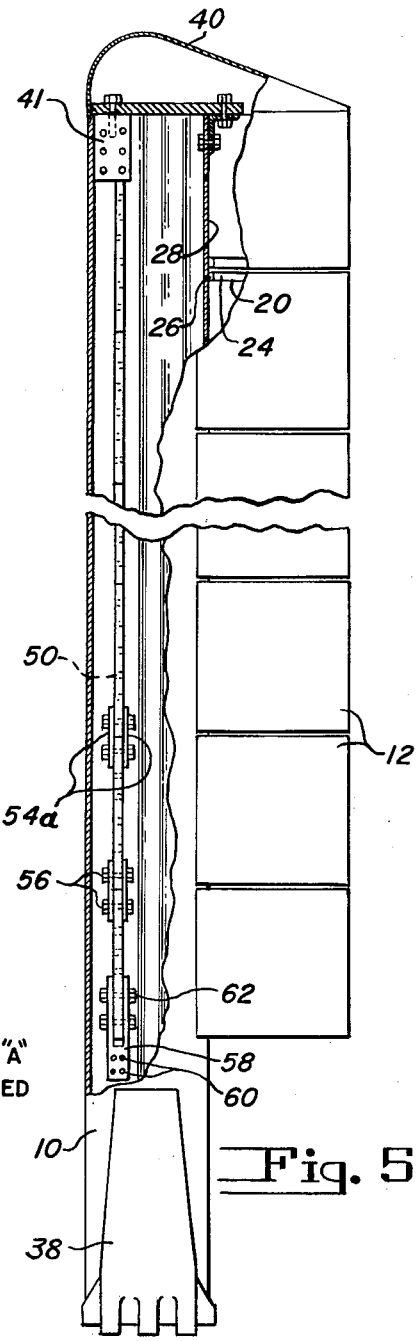
Fig. 5 is a plan view of a modified form of rotor blade embodying the invention, parts being broken away to facilitate illustration.

Still further variations may be obtained by holding some of the weight members 34 at the root end of the blade as shown in Fig. 5. The weight members are held together by plates 54a, which lie along each side, and bolts 56 which pass through the plates and lighter holes 50. The innermost weight member is secured to the spar by a fitting 58, which is channeled to receive said weight member, and holds it therebetween by bolts 62 extending through the fitting and lighter holes 50. The other end of fitting 58 is formed to fit the spar 10 internally and is held therein by bolts or rivets 60.

Figure 6:
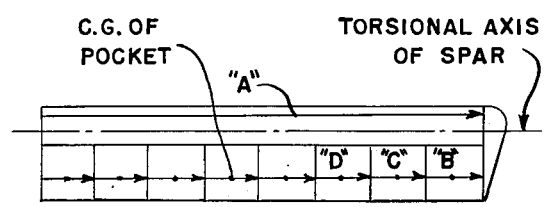
Figs. 6, 7 and 8 are diagrammatic views illustrating the invention.
Figure 7:
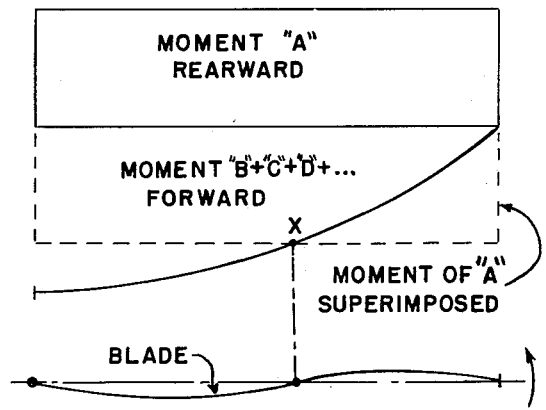
Figure 8:
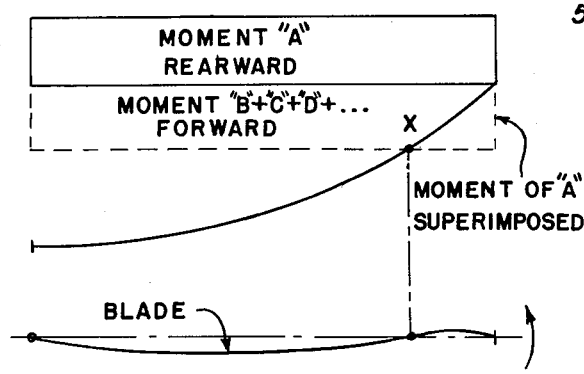

The relationships so obtained are illustrated in Figs. 6 through 8. As shown in Fig. 6, the weights which are not held at the root end give a moment A on the tip of the blade, and the pockets, which are unattached to one another, contribute a sum of smaller moments, such as B, C, D, etc., one for each pocket. The moment A acting forward of the bending, or torsional, axis 54 of the spar will cause the blade to bend backward and the sum of the moments B, C, D, etc., will cause the blade to bend forward. Therefore, the larger moment along the blade will determine the blade position, as can be seen exaggerated in Figs. 7 and 8. Where the moments cancel each other, such as point X, the blade will reverse its direction. Thus, in Fig. 7 a situation is illustrated where a large amount of weight is acting on the tip and in Fig. 8 where a lesser weight is acting likewise. Of course, by altering the ratio between the fixed weights and those weights which bear on the tip, the blade can be forced to bend into positions other than those shown, and by varying the individual weight of the weight members, it is possible to obtain an infinite number of balancing and bending variations.

In Fig. 4 the balanced relationship of the whole blade is indicated for a typical cross-section of the blade. Thus the moment about axis 54 of the weight of the balancing bar 34 acting through its moment arm X about the feathering or torsional axis 54 of the spar equals the moment of the weight of the pocket 12 acting through its moment arm Y. Thus the feathering axis and the center of gravity of the whole blade, where the spar is the structural member of the blade, are one and the same and the blade in rotating will have no tendency to bend forward in its plane of rotation due to the presence of the non-structural pockets 12.

It will be evident that as a result of this invention a metal rotor blade has been provided in which the bending axis of chordwise moments of the blade can be adjusted so as to include the aerodynamic center and the chordwise center of gravity of the blade by means of improved weight members which cooperate with the blade spar in an improved manner.

While a preferred embodiment of the invention has been shown and described herein, it will be evident that many variations in the construction and arrangement of the cooperating spar and weight members may be made without departing from the scope of the invention.

I claim:

1. A rotor blade of the type having a tubular metal spar which forms the strength member of the blade and provides the airfoil contour of the blade throughout the chordwise extent of the spar and having fairing means secured to the spar for completing the chordwise extent of the blade, said spar having internal spanwise beads on the upper and lower walls thereof, balancing means mounted within said spar comprising one or more bars of substantial mass adapted to be inserted spanwise in said spar and having channels in their upper and lower surfaces which register with said beads, and resilient means in said channels for frictionally gripping said beads.

2. A rotor blade of the type having a tubular metal spar which forms the leading edge and strength member of the blade, said spar having spanwise internal first guide means on its upper and lower walls adjacent the leading edge thereof and having fairing means completing the blade chordwise, balancing means comprising one or more metal bars having second guide means on their upper and lower surfaces which register with said internal first guide means on the upper and lower walls of said spar, and resilient means interposed between said first and second guide means for frictionally gripping said guide means.

3. A rotor blade comprising a one-piece tubular spar the outer surface of which conforms to the airfoil contour of the blade throughout substantially the entire chordwise extent of the spar, and fairing means secured to said spar for completing the airfoil contour of the blade, said spar having opposed spanwise beads formed on its internal upper and lower surfaces adjacent the leading edge of the spar, and a plurality of non-structural weights for correcting chordwise unbalance of the blade due to said fairing means comprising metal bars having strips of rubber-like material secured to their upper and lower surfaces in which said opposed beads are received in weight gripping relation.

4. A rotor blade comprising a tubular spar having opposed spanwise ribs on its internal walls, fairing members secured to the trailing edge of said spar for completing the blade chordwise, and one or more blade balancing weights mounted in and adapted to be inserted spanwise within said spar, said weights having opposed yielding surfaces in which said ribs are impressed for positioning said weights chordwise of said blade.

5. A rotor blade comprising a one-piece tubular spar having opposed spanwise ribs on its internal walls, and a plurality of blade balancing weights arranged spanwise of said blade and having opposed yielding surfaces cooperating with said ribs for positioning said weights chordwise of said blade, and means for securing at least one of said weights to the root of said spar against spanwise movement due to centrifugal forces.

6. A rotor blade comprising a one-piece tubular spar having opposed spanwise ribs on its internal walls, and one or more blade balancing weights arranged spanwise of said blade and having opposed yielding surfaces cooperating with said ribs for positioning said weights chordwise of said blade, and means secured to the tip end of said spar and forming a closure therefor for providing support for said weights due to centrifugal forces acting thereon.

7. A rotor blade comprising a one-piece tubular spar having opposed spanwise ribs on its internal walls, and a plurality of blade balancing weights arranged spanwise of said blade and having opposed yielding surfaces cooperating with said ribs for positioning said weights chordwise of said blade, means for securing at least one of said inboard weights to the root of said spar against outward spanwise movement, and means for securing the remainder of said weights against outboard spanwise movement including a closure member for the outboard end of said spar.

8. An elongated balancing bar for metal rotor blades, said bar having strips of rubber-like material secured to its elongated top and bottom surfaces, said strips having longitudinal grooves therein for positioning said bar in a rotor blade.

9. A balance weight for rotor blades comprising an elongated bar of substantial mass having upper and lower surfaces provided with a longitudinal groove in each of said surfaces, and a strip of rubber-like material disposed in said grooves and permanently bonded to said bar.

10. A balance weight for rotor blades comprising an elongated bar of substantial mass having upper and lower surfaces provided with a longitudinal groove in each of said surfaces, and a strip of rubber-like material disposed in said grooves and permanently bonded to said weight, said strips of rubber-like material each having a longitudinal groove formed in its outer surface.

11. A rotor blade comprising a tubular spar forming the main structural and strength member of the blade, said spar having opposed spanwise ribs on its internal walls, non-structural fairing members secured in a spanwise row along the trailing edge of said spar, and a plurality non-structural weights located in a spanwise row within said spar adjacent the leading edge thereof for balancing said fairing members about the feathering axis of the blade, said weights having opposed yielding surfaces which receive said ribs therein and cooperate with the latter in positioning said weights chordwise of said blade.

12. A rotor blade comprising a tubular spar having opposed spanwise ribs on its internal walls, a row of non-structural fairing members secured to the trailing edge of said spar for completing the airfoil contour of the blade aft of said spar, and a plurality of non-structural weights mounted in said spar adjacent the leading edge thereof having opposed yielding surfaces in which said opposed ribs of said spar are impressed.

13. A balancing weight for a rotor blade comprising an elongated bar of substantial mass having upper and lower surfaces provided with a longitudinal groove in each of said surfaces, and a mass of resilient rubber-like material secured in each of said grooves for positioning said weight in a rotor blade.

References Cited in the file of this patent

UNITED STATES PATENTS

| | | |
|---|---|---|
| 1,191,393 | Bergstrom | July 18, 1916 |
| 1,787,111 | Katow | Dec. 30, 1930 |
| 2,225,779 | Hart-Still | Dec. 24, 1940 |
| 2,303,707 | Pullin | Dec. 1, 1942 |
| 2,336,697 | Moeller | Dec. 14, 1943 |
| 2,430,948 | Platt | Nov. 18, 1947 |
| 2,435,604 | Rorden | Feb. 10, 1948 |
| 2,460,351 | Hoffman | Feb. 1, 1949 |
| 2,475,337 | Platt | July 5, 1949 |
| 2,613,893 | Young | Oct. 14, 1952 |
| 2,620,884 | Gluhareff | Dec. 9, 1952 |

FOREIGN PATENTS

| | | |
|---|---|---|
| 113,408 | Sweden | Mar. 6, 1945 |